United States Patent Office 2,760,463
Patented Aug. 28, 1956

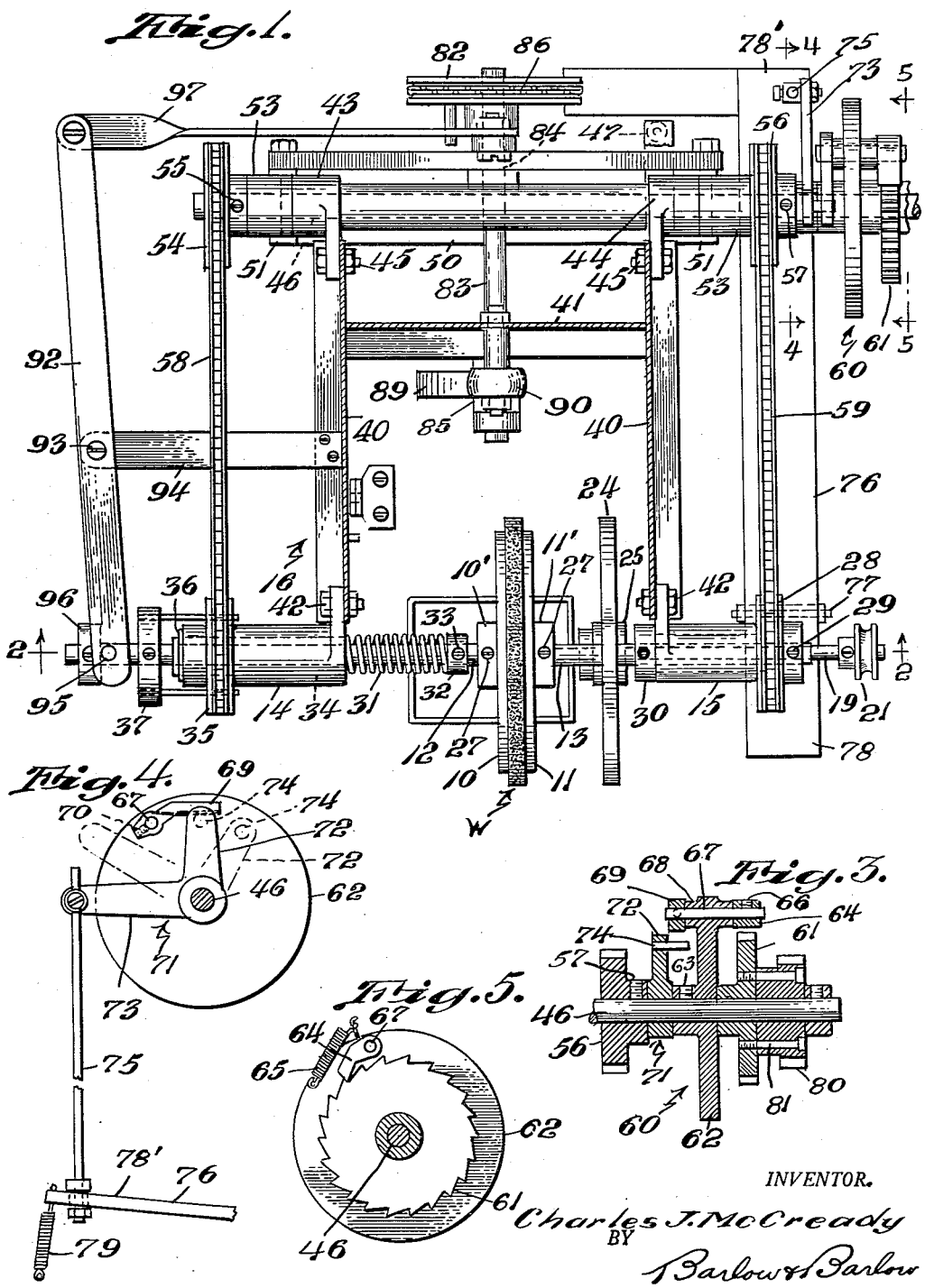

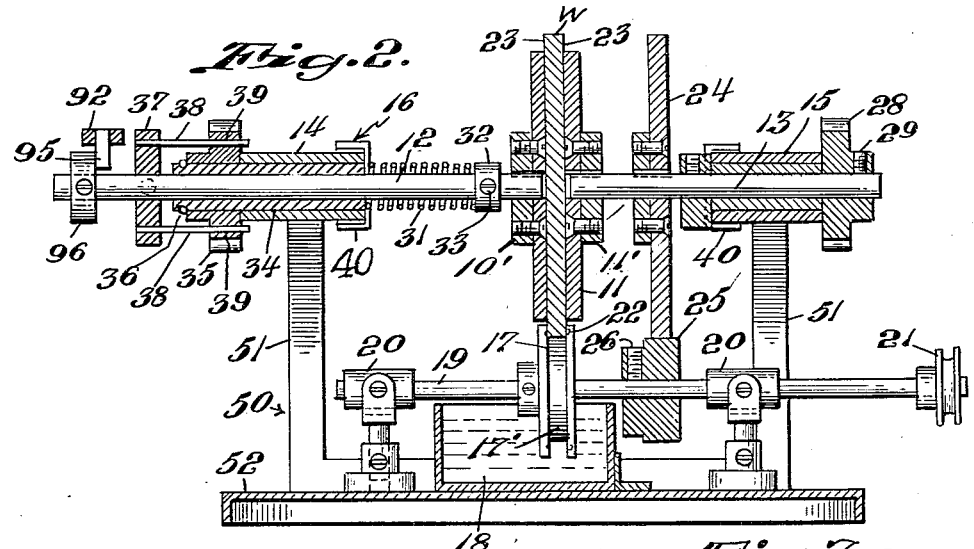
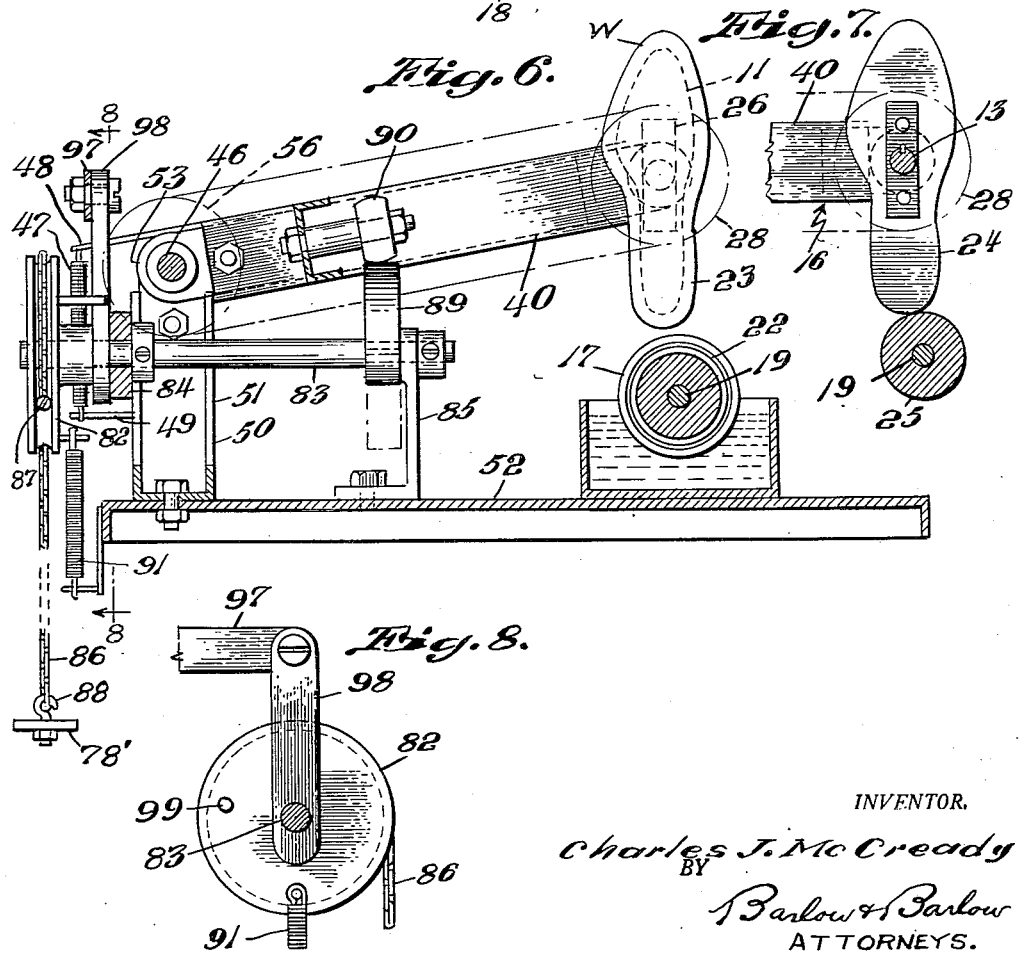

2,760,463

ADHESIVE APPLYING MACHINE FOR WORK PIECES HAVING AN IRREGULAR CONTOUR

Charles J. McCready, Barrington, R. I.

Application July 21, 1953, Serial No. 369,310

6 Claims. (Cl. 118—232)

This invention relates ton an adhesive-applying machine.

An object of the invention is to provide a machine for applying an adhesive to a work piece which may have an irregular contour and which may be made of a material easily deformed upon relatively light pressure applied thereon.

A more specific object of the invention is to provide a machine in which the work will bear against an adhesive-applying means at a controlled pressure.

Another object of the invention is to provide a machine in which the work will be gravity held in pressure controlled contact.

Another object of the invention is to provide a machine in which a work-carrying swingable work holder will be cam guided to control the pressure of the work on the adhesive-applying means.

With these and other objects in view, the inventon consists of certain novel features of construction as will be more fully described and particularly pointed out in the appended claims.

In the accompanying drawings:

Figure 1 is a top plan view partly in section showing an adhesive-applying machine embodying my invention;

Figure 2 is a sectional view taken substantially along lines 2—2 of Figure 1;

Figure 3 is a sectional view taken substantially centrally through the driving means of the machine;

Figure 4 is a sectional view taken substantially along line 4—4 of Figure 1;

Figure 5 is a sectional view taken substantially along line 5—5 of Figure 1;

Figure 6 is a central sectional view taken substantially centrally widthwise through the machine;

Figure 7 is a view partly in section of a fragmental portion of the swingable work holder of the machine showing means for guiding and supporting the free end thereof; and Figure 8 is a view taken substantially along line 8—8 of Figure 6 looking in the direction of the arrows on said line.

The machine in accordance with the present invention comprises a swingable work holder or cradle which carries rotatable clamp plates between which the work to be acted on is secured to be rotated therewith and presented to an adhesive-applying roller.

The work may have an irregular contour, as for example a shoe inner sole, made of a material which under slight pressure is easily deformed, as for example sponge rubber or foamed latex. The plates which clamp the sole are made to conform generally to the edge contour of the work piece and are of a size to enclose and expose only slightly more of the marginal edge of the work piece to which the adhesive is to be applied. The adhesive-applying roller is partly submerged in adhesive and is rotated to pick up and transfer adhesive to the said marginal edge of the work piece which bears against the roller under action of gravity on the cradle. The cradle is supported at its free end by a cam which bears against a roller and has a contour similar to the work but of slightly less dimension so as to carry the weight of the cradle and yet permit a light pressure of the work on the adhesive-applying roller which is insufficient to materially deform the work but does provide for assuring a sufficient deposit of adhesive on to the work. The work is rotated one revolution and then comes to rest to be removed and another work piece placed in position between the clamp plates to have the adhesive applied thereto.

Referring to the drawings, the work indicated W, as for example a shoe sole, is held between a pair of clamp plates 10, 11 which are carried at the ends of rotatable shafts 12, 13 journalled in bearings 14, 15 carried on a work holder or cradle 16 which is rockably mounted about shaft 46 to descend by gravity for presenting the work to an adhesive applicator roller 17 (see Figure 2) which is rotatable within an adhesive container 18. The roller is partially submerged in the adhesive and is mounted on a shaft 19 journalled in bearings 20 and has a groove 17' in which is received the marginal edge of the work. A driven pulley or like element 21 is attached to the shaft 19 and may be rotated from a suitable power source (not shown) for rotating the roller 17 to pick up adhesive to transfer the same on to the work in contact with the roller. The roller may be provided with an annular groove 22 in the inner side walls or flanges of the roller to pick up adhesive to deposite the same on the marginal side edges 23 of the work W. The work is maintained in engagement with the roller 17 through gravity action of the cradle 16. With the view to controlling the pressure of the cradle transmitted to the work on the said roller 17, a cam 24 (see also Figure 7) is secured to the shaft 13 and extends to bear against a roller 25 which is fixed to the shaft 19 as at 26 (see Figure 2). Thus, the free end of the cradle is supported on the roller 25 and will be raised or lowered in response to the particular portion of the cam 24 moved into engagement with the said roller 25.

The cam 24 has an edge contour shaped similar to the edge contour of the work and is of a dimension slightly less than the work which when positioned between the clamp plates 10, 11 is substantially aligned with the cam, whereby the pressure between the work and the roller 17 will be that provided by the difference in dimension between the said cam and work. Thus, by a proper choice of dimension of cam 24, the amount of pressure of the work on the roller 17 is controlled so as to prevent any substantial deformation of the work piece, thus assuring an even distribution of the adhesive on the edge and marginal side edges of work.

The clamp plates 10, 11 are similar to each other and have an edge contour (see Figure 6) which is shaped generally similar to that of the work W but of much less dimension, which provides for a substantial marginal side edge 23 of the said work to extend beyond the clamp plates as shown. Each clamp plate has an apertured boss-like element 10', 11', respectively, in which the end of the shaft associated therewith is received to have the plate secured thereto as by means of a screw fastening 27 (see Figure 1). The shaft 13 has a driven sprocket 28 secured thereto as at 29 and abuts against the outer edge of the bearing 15. A collar 30 is secured to the shaft 13 on the opposite side of the bearing 15 to engage thereagainst, which with the sprocket 28 prevents axial movement of the shaft 13. The shaft 12 is mounted for axial movement and is resiliently biased for inward movement or towards the right by a coil compression spring 31 which encircles the shaft 12 and one end of which engages against the bearing 14 and the other end thereof bearing against a collar 32 which is adjustably secured to the said shaft by a screw fastening 33. Thus, the expanding force of the spring 31 will tend to move the plate 10 which is secured to the shaft 12 towards the plate 11 which is that fixed to the shaft 13.

The bearing 14 has a sleeve 34 (see Figure 2) therethrough which is frictionally held in place and projects beyond the outer edge of the bearing. A sprocket 35 which is of a similar dimension to that of the sprocket 28 is mounted for free rotation on the projecting portion of the sleeve 34 and is held thereon by a ring fastening 36. The shaft 12 extends through and beyond the sleeve and a disk 37 is secured on this portion of the shaft beyond the sleeve for rotation therewith. The disk 37 carries two pins 38 positioned diametrically opposite each other and project therefrom to be received in aligned openings 39 provided in the sprocket 35, thus connecting the shaft 12 to the said sprocket 35 to be rotated therewith but permitting axial movement of said shaft 12 relative to the sprocket 35. When a work piece W is to be positioned or removed from between the clamp plates, the shaft 12 is pulled towards the left by mechanism to be hereinafter described to move or separate the plate 10 from the work which then may be removed and a new work piece positioned to be engaged by the resiliently biased plate 10 upon release of the said shaft 12.

The cradle 16 has spaced arms 40 (see Figure 1) which are connected to each other by a right angularly extending brace or bridge 41. The bearings 14, 15 are secured at the forward end of said arms as at 42 and similar bearings 43, 44 are similarly secured at the other end of the arms as at 45. The latter bearings encircle a shaft 46 which provides a bearing about which the cradle rocks or swings to present the work to the said roller 17. As previously stated, the cradle 16 moves towards the work by gravity action and is partially counterbalanced by a pull spring 47 (see Figure 6) which has one end thereof secured to the cradle as at 48 and the other end thereof to a pin 49 projecting from the frame 50 of the machine.

The frame 50 is of generally U shape providing spaced arms 51 which rise generally vertically from a bed plate 52 and carries at the upper end thereof bearings 53 in which is journalled the shaft 46. The bearings 43, 44 abut against the inner edge of the bearings 53, thus blocking lateral movement of the cradle axially of the shaft 46. The shaft 46 projects beyond the bearings 53 and a sprocket 54 is attached to one end of the shaft as at 55 and abuts against the outer edge of the adjacent bearing 53. A sprocket 56 is similarly attached to the other end portion of the shaft as at 57 and abuts against the outer edge of the adjacent bearing 53, thus preventing axial movement of the shaft 46. The shaft 46 is the main drive shaft of the machine, and the sprocket 54 is connected by a chain drive 58 to the sprocket 35 and the sprocket 56 is similarly connected to the sprocket 28 by a chain drive 59. All of the above-mentioned sprockets are the same dimension and the shafts 12 and 13 will be rotated in unison at the same relative speed to each other and in the same direction.

In accordance with the invention, the shaft 46 will be rotated one reovlution and then come to rest. In the present instance this is accomplished by employing a one-revolution clutch designated generally 60 (see Figure 3) and which comprises a ratchet wheel 61 mounted on the shaft 46 for free rotation thereon. A disk 62 is attached to the shaft 46 as at 63 to rotate with the shaft and carries a pawl 64 on one side thereof (see Figure 5) which is resiliently biased into engagement with the ratchet wheel 61 by means of a pull spring 65. The pawl 64 is fixed as at 66 to a shaft 67 which is journalled in a bearing opening 68 located in the marginal edge of the disk 62. A lift finger 69 (Figure 4) on the other side of the disk 62 is attached to the shaft 67 as at 70. A crank 71 is pivotally mounted on the shaft 46 and provides substantially right angular arms 72, 73. The arm 72 carries a pin 74 which protrudes therefrom to be in the path of movement of the lift finger 69 upon the rotation of said disk 62. The arm 73 is connected through a rod or the like 75 to a foot operated treadle 76 which is pivotally mounted on a pivot 77 (see Figure 1) which is at a location to provide a foot-engaging portion 78 on one side of the pivot 77 to be engaged by the operator to swing the other end portion 78' of the treadle 76 upwardly, which through the rod 75 will rock the crank 71 clockwise as seen in Figure 4. The normal position of the crank 71 is that shown in full lines in this Figure 4 wherein the lift finger 69 is held in the position shown by the pin 74 on the arm 72. In this position of the lift finger 69, the pawl 64 is held out of engagement with the ratchet wheel 61. Upon the crank 71 being rocked in a clockwise direction as above described from the normal full line position to that shown in broken lines, the lift finger 69 now free of the pin 74 will under urge of gravity and bias of the spring 65 drop or be moved clockwise and rotate shaft 67 to move the pawl 64 into engagement with the ratchet wheel 61. The ratchet wheel being in continuous rotation in a clockwise direction as seen in Figure 5 will carry the pawl 64 therewith and through shaft 67 rotate the disk 62 and thereby the shaft 46. Upon release of the foot treadle 76, the same will be returned to its normal position in any suitable manner, as for example a pull spring 79. This will return the crank 71 to the said normal position shown in full lines in Figure 4. The disk 62 is rotated in a counter-clockwise direction as seen in Figure 4, and the finger 69 will ride upon the pin 74 and be lifted thereby to rock the shaft 67 to move the pawl 64 out of engagement with the ratchet wheel 61 and the shaft 46 will come to rest.

The ratchet wheel 61 may be driven in any appropriate manner. In the instant disclosure a sprocket 80 having free rotation on the shaft 46 and driven from any suitable power source (not shown) is secured to the ratchet wheel 61 as at 81 to rotate therewith.

In the operation of the machine, the cradle 16 is manually moved to present the work to the adhesive applicator roll 17 and to this end a sheave 82 (see Figures 1–6) is mounted on a shaft 83 which extends at right angles to the shaft 46 and is journalled in bearings 84, 85. A flexible connector 86, such as a chain, partially encircles the sheave and is attached thereto as at 87. The chain 86 extends to the forward portion 78' of the treadle 76 and is secured thereto as at 88. Upon swinging the treadle 76 downwardly by the operator pushing downwardly on the said treadle forwardly of the pivot 77, the sheave 82 and the shaft 83 will be rotated in a clockwise direction as seen in Figure 8. There is mounted on the shaft 83 a cam 89 which is engaged by a roller 90 carried on the bridge 41. At the normal position of the sheave 82, the low side of the cam 89 is uppermost and spaced from the roller 90 a distance to permit the full downward swing of the cradle 16 required to present the work to the roller 17. Upon rotation of the sheave 82 as above described, the cam 89 will be turned to engage the roller 90 to raise and hold the cradle 16 to free the work from the said roller 17 (see Figure 6). Upon release of the treadle, the sheave 82 by action of a pull spring 91 will be rotated in the opposite direction to rotate the cam 89 to free the cradle of the same whereupon the cradle will swing downwardly by gravity to place the cam 24 in engagement with the roller 25.

The clamp plates 10, 11 are separated by means of a lever 92 (see Figure 1) which is pivotally attached as at 93 to a bracket 94 carried by the cradle 16. The lever 92 extends from one side of the pivot 93 toward the shaft 12 and has a pin 95 (see also Figure 2) which projects in abutting relation with the inner edge of a collar 96 which is adjustably fixed to the outer end portion of the shaft 12. The other end of the lever 92 is connected by a link 97 to a lever 98 (see Figure 8) which is pivotally mounted on the shaft 83 for free rotation thereon and at a location adjacent to the sheave 82. A pin 99 carried by the sheave 82 is adapted to engage and swing the lever 98 in a clockwise direction. The spacing of the pin 99 relative to the lever 98 is such that the high portion of the cam 89 will have been moved to the uppermost portion thereof to free the work of the roller 17, as seen in Figure 6, just prior to the pin 99 moving into engagement with the said lever 98. Upon further movement of the sheave 82 in the same direction, the pin 99 will engage and rock the lever 98, which movement through the connections above described will swing the lever 92 for the pin 95 to axially move the shaft 12 outwardly to free the clamp plate 10 from the work.

The operation of the several parts of the machine has been given in connection with the detailed description thereof, and a brief general description of the operation of the operation of the machine as a whole will suffice to clearly understand its mode of operation. Assuming the deposit of adhesive on a previous work piece W having been completed, the operator pushes downwardly on the treadle 76 rearwardly of the pivot 77, which swings the end 78' downwardly to pull on the chain 84 to rotate the sheave 82 and the shaft 83 clockwise as seen in Figure 8 to turn the cam 89 thereon (Figure 6) to raise and hold the cradle 16 in an inoperative position and the work piece free of the adhesive applicator roller 17. Upon a further downward pressure on the treadle, the sheave 82 will be further rotated in the same direction and the pin 99 carried thereby will be moved into engagement with the edge of the lever 98 to rock the same in the same direction to swing the lever 92 in a clockwise direction as seen in Figure 1 to axially move the shaft 12 and thus the clamp plate 10 from the work piece W, which may drop into the operator's hand or be removed from the plate 11. A new work piece is then properly positioned against the plate 11. The operator may now ease the release of the pressure on the treadle 76 to permit the bias of the spring 31 to move the shaft 12 to position the plate 10 against the work piece and thus clamp the same between the said clamp plates. The treadle 76 may now be released to permit the cradle 16 to swing downwardly to position the cam 24 against the roller 25. The operator next applies pressure downwardly on the portion 78 of the treadle to raise the end 78' and the rod 75. This will rock the crank 71 to free the finger 69 and the pawl 64 which will move into engagement with the ratchet wheel 61 and be carried therewith to rotate the disk 62 and the shaft 46 to rotate the work piece upon the adhesive applying roller 17. The operator now releases the treadle, whereupon the crank 71 will be free to move as previously described to position the pin 74 in the path of the lift finger 69 which will ride on said pin 74 to lift the pawl 69 into the inoperative position thereof, whereupon the shaft 46 will come to rest to complete a cycle of operation of the machine.

I claim:

1. A machine for applying an adhesive to a work piece comprising an adhesive applicator, a pivotally mounted cradle, a pair of axially aligned rotatable shafts positioned end to end journalled in said cradle and each having a clamp plate secured thereto at the ends thereof adjacent to each other, said shafts being axially movable relative to each other for moving said plates toward and from each other for securing the work therebetween, said cradle being swingable towards and from said applicator for moving the work into and out of engagement with said applicator, and means including a one-revolution clutch for rotating said shafts in unison a single revolution at each cycle of operation of the machine.

2. A machine for applying an adhesive to a work piece comprising an adhesive applicator, a pivotally mounted cradle, a pair of axially aligned rotatable shafts positioned end to end journalled in said cradle and each having a clamp plate secured thereto at the ends thereof adjacent to each other, one of said shafts being axially movable and resiliently biased for moving the plate thereon toward the other of said plates for resiliently securing the work between said plates, said cradle being swingable towards and from said applicator for moving the work into and out of engagement with said applicator, and means for rotating said shafts in unison.

3. A machine for applying an adhesive to a work piece comprising an adhesive applicator, a pivotally mounted cradle, a pair of axially aligned rotatable shafts positioned end to end journalled in said cradle and each having a clamp plate secured thereto at the adjacent ends thereof, one of said shafts being axially movable and resiliently biased for moving the plate thereon toward the other of said plates for resiliently securing the work between said plates, an abutment on said axially movable shaft, and a manually operated lever engaging said abutment for axially moving said axially movable shaft against said resilient bias for separating said plates to free the work therefrom, said cradle being swingable towards and from said applicator for moving the work into and out of engagement with said applicator, and means for rotating said shafts in unison.

4. A machine for applying an adhesive to a work piece comprising an adhesive applicator, a pivotally mounted cradle, a pair of axially aligned rotatable shafts positioned end to end journalled in said cradle and each having a clamp plate secured thereto at the ends thereof adjacent to each other, said shafts being relatively axially movable for moving said plates toward and from each other for securing the work between said plates, said cradle being swingable towards and from said applicator for moving the work into and out of engagement with said applicator, and means for rotating said shafts in unison.

5. A machine for applying an adhesive to a work piece having an irregular contour comprising a rotatable adhesive applicator, a drive shaft, a cradle pivotally mounted on said drive shaft for free movement about said drive shaft, a pair of aligned driven shafts positioned end to end journalled in said cradle and each having a clamp plate secured thereto between which the work is held at the ends thereof adjacent to each other, means for driving said driven shafts in unison from said drive shaft, said cradle being gravity urged for moving and holding the work into engagement with said applicator.

6. A machine for applying an adhesive to a work piece having an irregular contour comprising a rotatable adhesive applicator, a drive shaft, a cradle pivotally mounted on said drive shaft for free movement about the same, a pair of aligned driven shafts positioned end to end journalled in said cradle and each having a clamp plate secured thereto between which the work is held at the ends thereof adjacent to each other, one of said shafts being axially movable and resiliently biased for resiliently holding the work between said plates, a pair of drive sprockets on said drive shaft, a driven sprocket on each of said driven shafts, means connecting the drive sprockets to the driven sprockets for driving said driven shafts in unison with each other, said cradle being gravity urged for moving and holding the work into engagement with said applicator.

References Cited in the file of this patent

UNITED STATES PATENTS

| | | |
|---|---|---|
| 179,905 | Fitts | July 18, 1876 |
| 1,297,660 | Collins | Mar. 18, 1919 |
| 1,318,683 | Milkewitz et al. | Oct. 14, 1919 |
| 1,387,964 | Bourn | Aug. 16, 1921 |
| 1,828,855 | Bourn | Oct. 27, 1935 |
| 2,284,366 | Bryant | Mar. 26, 1942 |
| 2,357,471 | Jalbert | Sept. 5, 1944 |
| 2,596,176 | Scherer | May 13, 1952 |